(12) United States Patent
Shimura et al.

(10) Patent No.: US 11,282,641 B2
(45) Date of Patent: Mar. 22, 2022

(54) CERAMIC ELECTRONIC DEVICE AND MANUFACTURING METHOD OF THE SAME

(71) Applicant: TAIYO YUDEN CO., LTD., Tokyo (JP)

(72) Inventors: Tetsuo Shimura, Tokyo (JP); Tomoya Hagiwara, Tokyo (JP); Yasuyuki Inomata, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 0 days.

(21) Appl. No.: 17/037,462

(22) Filed: Sep. 29, 2020

(65) Prior Publication Data

US 2021/0118615 A1    Apr. 22, 2021

(30) Foreign Application Priority Data

Oct. 17, 2019    (JP) .............................. JP2019-190494

(51) Int. Cl.
*H01G 4/12*    (2006.01)
*H01G 4/30*    (2006.01)

(52) U.S. Cl.
CPC ......... *H01G 4/1227* (2013.01); *H01G 4/1236* (2013.01); *H01G 4/306* (2013.01)

(58) Field of Classification Search
None
See application file for complete search history.

(56) References Cited

U.S. PATENT DOCUMENTS

| 2004/0169967 | A1* | 9/2004 | Konaka | ................ H01G 4/1227 361/15 |
| 2006/0114641 | A1* | 6/2006 | Iwasaki | ............... C04B 35/6281 361/321.4 |
| 2009/0219666 | A1* | 9/2009 | Fukuda | ............... C04B 35/6281 361/301.4 |
| 2015/0279564 | A1 | 10/2015 | Naito | |

FOREIGN PATENT DOCUMENTS

JP    2015-195352 A    11/2015
JP    2017-28254 A    2/2017

* cited by examiner

*Primary Examiner* — Dion R. Ferguson
(74) *Attorney, Agent, or Firm* — Stein IP, LLC

(57) ABSTRACT

A ceramic electronic device includes a multilayer structure in which each of dielectric layers and each of internal electrode layers are alternately stacked, wherein a main component of the dielectric layers is $(Ba, Sr, Ca)(Zr, Ti)O_3$, wherein a Ba concentration and a Ca concentration have variation in at least one of crystal grains in the dielectric layers.

12 Claims, 5 Drawing Sheets

CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2019-190494, filed on Oct. 17, 2019, the entire contents of which are incorporated herein by reference.

FIELD

A certain aspect of the present invention relates to a ceramic electronic device and a manufacturing method of the ceramic electronic device.

BACKGROUND

A paraelectric perovskite type oxide (Ba, Sr, Ca)(Zr, Ti)$O_3$ is used for a main component of ceramic composition used for temperature compensation material. There is disclosed a multilayer ceramic capacitor including such a paraelectric perovskite type oxide for a dielectric layer (for example, see Japanese Patent Application Publication No. 2015-195352, and Japanese Patent Application Publication No. 2017-28254).

SUMMARY OF THE INVENTION

The present invention has a purpose of providing a ceramic electronic device that is capable of improving reliability of a dielectric layer and a manufacturing method of the ceramic electronic device.

According to an aspect of the present invention, there is provided a ceramic electronic device including: a multilayer structure in which each of dielectric layers and each of internal electrode layers are alternately stacked, wherein a main component of the dielectric layers is (Ba, Sr, Ca)(Zr, Ti)$O_3$, wherein a Ba concentration and a Ca concentration have variation in at least one of crystal grains in the dielectric layers.

According to another aspect of the present invention, there is provided a manufacturing method of a ceramic electronic device including: forming a multilayer structure in which each of dielectric green sheets and each of metal conductive paste layers are alternately stacked, the dielectric green sheets including powder of (Ba, Sr, Ca)(Zr, Ti)$O_3$, forming dielectric layers from the dielectric green sheets by firing the multilayer structure; and cooling the multilayer structure after the firing, wherein a cooling condition of the cooling is adjusted in the cooling so that a Ba concentration and a Ca concentration have variation in at least one of crystal grains in the dielectric layers.

DETAILED DESCRIPTION

A dielectric constant of (Ba Sr, Ca)(Zr, Ti)$O_3$ is relatively small. Therefore, it is requested to reduce a thickness of dielectric layers and stack the dielectric layers, in order to downsize a device. It is requested to improve reliability of the dielectric layers in order to reduce the thickness of the dielectric layers.

When a metal such as Ni is used for an internal electrode layer, a firing process in reducing atmosphere is performed. In this case, a Ti ion of (Ba, Sr, Ca)(Zr, Ti)$O_3$ is subjected to the reductive atmosphere. And, (Ba, Sr, Ca)(Zr, Ti)$O_3$ may have electron conductivity. Therefore, when the thickness of the dielectric layers is reduced, reliability relating to insulation resistance of the dielectric layers may be degraded.

A description will be given of an embodiment with reference to the accompanying drawings.

Figure 1:
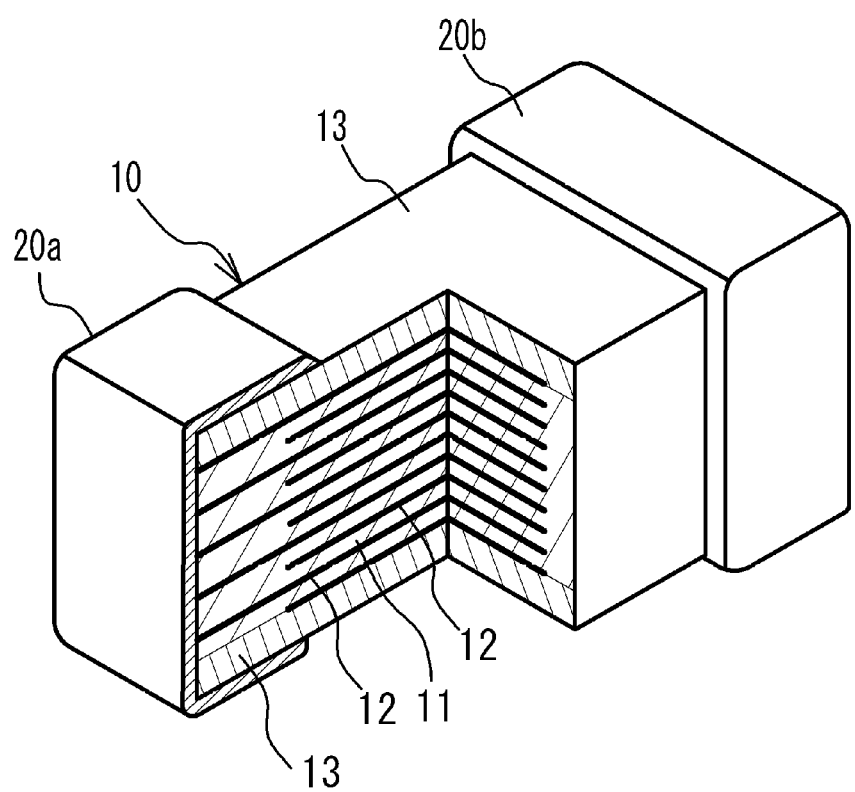
FIG. 1 illustrates a perspective view of a multilayer ceramic capacitor in which a cross section of a part of the multilayer ceramic capacitor is illustrated.

(Embodiment) FIG. 1 illustrates a perspective view of a multilayer ceramic capacitor 100 in accordance with an embodiment, in which a cross section of a part of the multilayer ceramic capacitor 100 is illustrated. As illustrated in FIG. 1, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face faces with the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, the internal electrode layer 12 is positioned at an outermost layer. The upper face and the lower face of the multilayer chip 10 that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. It is preferable that an average thickness of each of the internal electrode layers 12 is 1 μm or less. It is more preferable that the average thickness is 0.5 μm or less.

The dielectric layers 11 are mainly composed of a ceramic material that is expressed by a general formula $ABO_3$ and has a perovskite structure. The perovskite structure includes $ABO_{3-\alpha}$ having an off-stoichiometric composition. In concrete, a main component of the dielectric layers 11 is (Ba, Sr, Ca)(Zr, Ti)$O_3$. An A site of (Ba, Sr, Ca)(Zr, Ti)$O_3$ includes Ba (barium), Sr (strontium) and Ca (calcium). A B site of (Ba, Sr, Ca)(Zr, Ti)$O_3$ includes Zr (zirconium) and Ti (titanium). There may be a case where the A site does not include Ba. (Ba, Sr, Ca)(Zr, Ti)$O_3$ is paraelectrics and has temperature compensation characteristic in which dependency of electrostatic capacity on temperature is small. A standard composition of (Ba, Sr, Ca)(Zr, Ti)$O_3$ is an average composition ratio of Ba, Sr, Ca, Zr and Ti of whole of the dielectric layers 11. It is possible to confirm the standard composition by performing an area analysis of a plurality of areas by TEM (Transmission Electron Microscope) in order to suppress the influence of segregation. For example, when the standard composition of the dielectric layers 11 is expressed as $(Ba_xSr_yCa_z)(Zr_sTi_t)O_3$, relationships $0 \leq x < 0.4$, $0 < y < 0.7$, $0 < z < 0.8$, $x+y+z=1$, $0.9 \leq s < 1$, $0 < t < 0.1$, $s+t=1$ are satisfied.

For example, the internal electrode layers 12 are formed by firing metal conductive paste including metal powder. The dielectric layers 11 and the cover layers 13 are formed by firing green sheets including ceramic powder. Base metal powder is used for the internal electrode layers 12. It is therefore preferable that reductive atmosphere is used as the firing atmosphere. In this case, the reductive atmosphere has influence on Ti ions of (Ba, Sr, Ca)(Zr, Ti)$O_3$. And (Ba, Sr, Ca)(Zr, Ti)$O_3$ may have electron conductivity. Therefore, when the thickness of the dielectric layers 11 is reduced, reliability of insulation resistance of the dielectric layers 11 may be degraded. And so, the dielectric layers 11 of the embodiment have a structure for improving the reliability.

Figure 2:
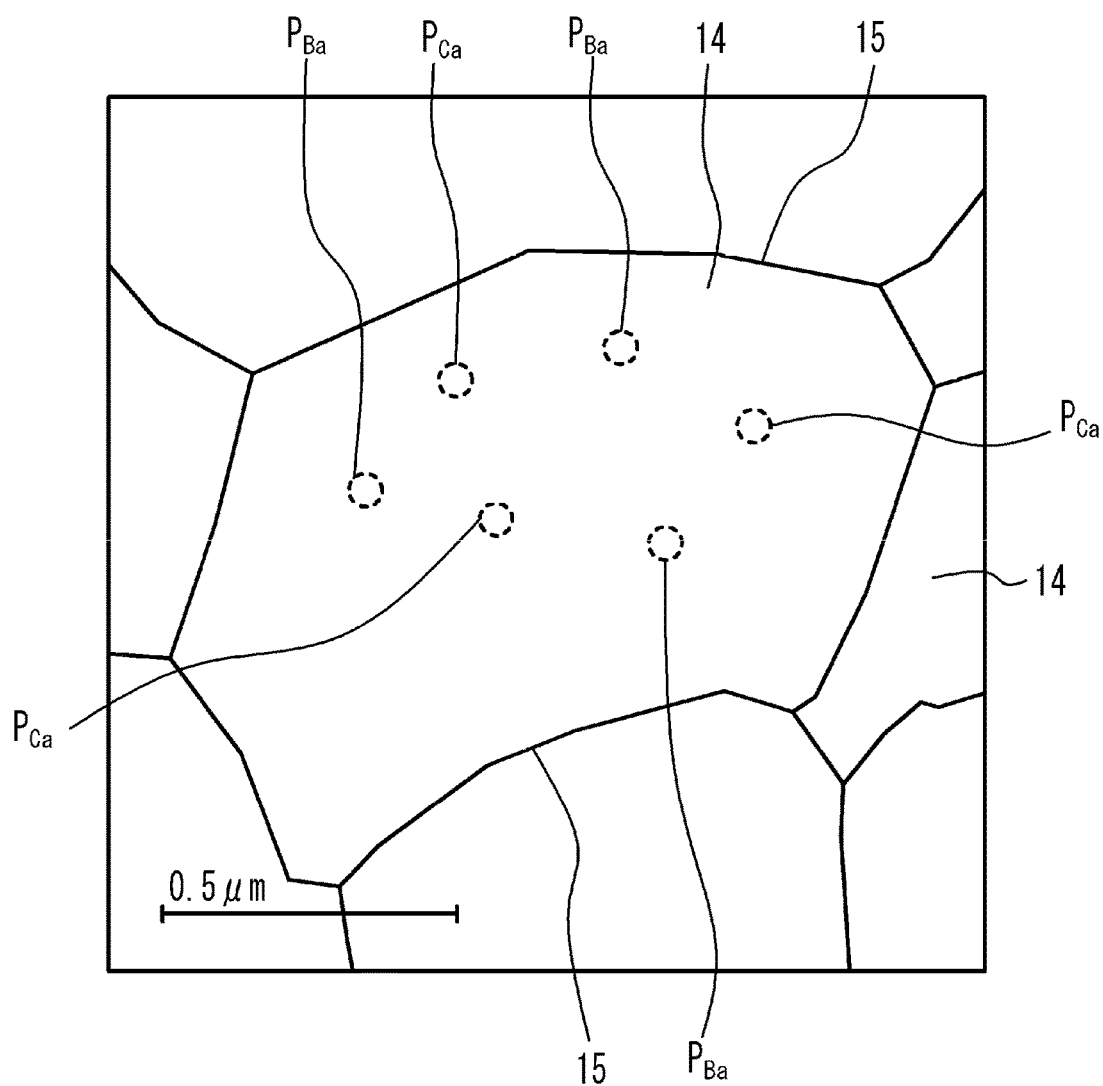
FIG. 2 illustrates each crystal grain of dielectric layers.

FIG. 2 illustrates cross sections of crystal grains 14 in the dielectric layers 11. As illustrated in FIG. 2, the dielectric layers 11 have the crystal grains 14 of which an interface is a crystal grain boundary 15. The crystal grains 14 are crystal grains of (Ba, Sr, Ca)(Zr, Ti)$O_3$. Each of the crystal grains 14 has a part in which an amount of Ba is larger than an average amount of Ba of grains of (Ba, Sr, Ca)(Zr, Ti)$O_3$ and a part in which an amount of Ca is larger than an average amount of Ca of grains of (Ba, Sr, Ca)(Zr, Ti)$O_3$. That is, the concentration of Ba and the concentration of Ca are uneven in each of the crystal grains 14. For example, when spot quantitative analysis is performed, Ba-rich spots $P_{Ba}$ and Ca-rich spots $P_{Ca}$ are mixed together as illustrated in FIG. 2. However, in each of the spots, the A site includes Ba, Sr and Ca, and the B site includes Zr and Ti. The dielectric layers 11 have temperature compensation characteristic. The spot size (spot diameter) is, for example, approximately 1.0 nm.

When the crystal grains 14 of the dielectric layers 11 have such a structure, it is possible to suppress the breakdown until a high voltage, in comparison with a case where Ca and Ba are solid-solved in the crystal grain 14 and the ratio of the concentration of Ca/the concentration of Ba is even in the crystal grain 14. This is because the composition distribution (unevenness of the concentration of Ca and the concentration of Ba) formed in the crystal grains 14 acts as a barrier against the diffusion of ions, insulation performance is enhanced, and breakdown at an electric field hardly occurs. It is therefore possible to improve the reliability of the insulation resistance which the dielectric layers 11 still have the temperature compensation.

When the spots $P_{Ba}$ and the spots $P_{Ca}$ are mixed together in the crystal grain 14, the crystal grain is not separated into the Ba-rich region and the Ca-rich region but the spots $P_{Ba}$ and the spots $P_{Ca}$ are randomly located. Therefore, when spots are randomly selected in the cross section of one of the crystal grains 14, there may be a case where the spots $P_{Ba}$ and the spots $P_{Ca}$ are alternately arrayed.

It is preferable that the variation of the Ba concentration and the variation of the Ca concentration are large in each of the spots of the crystal grain 14. For example, it is preferable that a CV (Coefficient of Variation) of the Ca concentration (atm %)/the Ba concentration (atm %) of each spot is 0.06 or more, when a plurality of spots (for example, 20 spots) are selected from the cross section of one or more of the crystal grains 14 and the plurality of spots are subjected to EDS element analysis using TEM (Transmission Electron Microscope). It is more preferable that the CV value is 0.12 or more. It is still more preferable that the CV value is 0.19 or more. The 20 spots may be selected 10 spots of one of the crystal grains 14 and 10 spots of another of the crystal grains 14. A half of the plurality of spots may be selected from the Ba-rich spots $P_{Ba}$, and the rest half may be selected from the Ca-rich spots $P_{Ca}$.

For example, an average value of the grain diameter of the crystal grains 14 is 0.1 μm or more and 1.0 μm or less.

When the thickness of the dielectric layers 11 is reduced, the influence of the reliability degradation of the dielectric layers 11 is large. Therefore, the effect of the reliability improvement of the dielectric layers 11 is remarkable when the thickness of the dielectric layers 11 is reduced. For example, when the thickness of the dielectric layers 11 is 1 μm or more and 10 μm or less, the effect of the reliability improvement is remarkable. When the thickness of the dielectric layers 11 is 1 μm or more and 5 μm or less, the effect of the reliability improvement is more remarkable.

Figure 3:
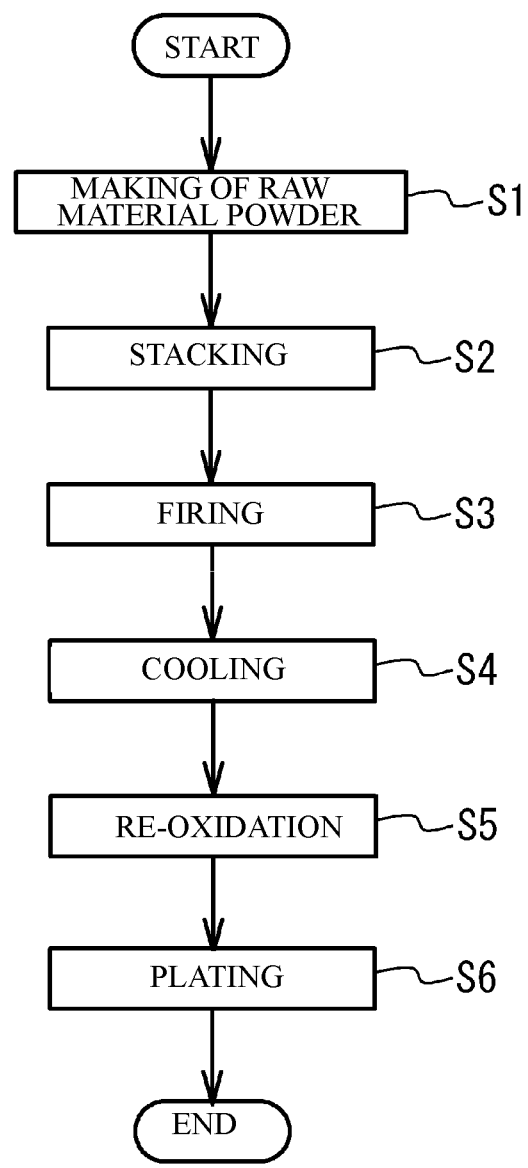
FIG. 3 illustrates a manufacturing method of a multilayer ceramic capacitor.

Next, a description will be given of a manufacturing method of the multilayer ceramic capacitor 100. FIG. 3 illustrates a manufacturing method of the multilayer ceramic capacitor 100.

(Making process of raw material powder) A dielectric material for forming the dielectric layer 11 is prepared. Ceramic powder of (Ba, Sr, Ca)(Zt, Ti)$O_3$ is prepared. Various methods can be used as a synthesizing method of the ceramic powder of (Ba, Sr, Ca)(Zt, Ti)$O_3$. For example, a solid-phase method, a sol-gel method, a hydrothermal method or the like can be used. The embodiment may use any of these methods.

An additive compound may be added to resulting ceramic powders, in accordance with purposes. The additive compound may be an oxide of Mo (molybdenum), Nb (niobium), Ta (tantalum), W (tungsten), Mg (magnesium), Mn (manganese), V (vanadium), Cr (chromium), a rare earth element (Y (yttrium), Sm (samarium), Eu (europium), Gd (gadolinium), Tb (terbium), Dy (dysprosium, Ho (holmium), Er (erbium), Tm (thulium), and Yb (ytterbium)), Co (cobalt), Ni, Li (lithium), B (boron), Na (sodium), K (potassium) and Si, or glass.

The ceramic powder is mixed with compound including additives and are calcined in a temperature range from 820 degrees C. to 1150 degrees C. Next, the resulting ceramic powder is wet-blended, and is dried and crushed. For example, it is preferable that an average particle diameter of the resulting ceramic powder is 50 nm to 300 nm from a viewpoint of thickness reduction of the dielectric layer 11. The particle diameter may be adjusted by crushing the resulting ceramic powder as needed. Alternatively, the particle diameter of the resulting ceramic power may be adjusted by combining the crushing and classifying.

(Stacking process) Next, a binder such as polyvinyl butyral (PVB) resin, an organic solvent such as ethanol or toluene, and a plasticizer are added to the resulting dielectric material and wet-blended. With use of the resulting slurry, a base material is coated with a stripe-shaped dielectric green sheet, for example, a die coater method or a doctor blade method, and then dried.

Then, a pattern of the internal electrode layer 12 is provided on the surface of the dielectric green sheet by printing metal conductive paste for forming an internal electrode with use of screen printing or gravure printing. The conductive paste includes an organic binder. The metal conductive paste may include ceramic particles as a co-material. The metal conductive paste may not necessarily include the ceramic particles. When the metal conductive paste includes the ceramic particles, a main component of the ceramic particles is not limited. However, it is preferable that the main component of the ceramic particles is the same as that of the dielectric layer 11.

Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to a pair of the external electrodes 20a and 20b of different polarizations. A cover sheet to be the cover layer 13 is clamped to an upper face of the stacked dielectric green sheets, and another cover sheet to be the cover layer 13 is clamped to a lower face of the stacked dielectric green sheets. The resulting stacked structure is stamped into a predetermined size (for example, 1.0 mm×0.5 mm).

(Firing process) The binder is removed in $N_2$ atmosphere. After that, the resulting compact is fired for 10 minutes to 2 hours in a reducing atmosphere having an oxygen partial pressure of $10^{-5}$ to $10^{-8}$ atm in a temperature range of 1100 degrees C. to 1300 degrees C. Thus, each compound is sintered. In this manner, the ceramic multilayer structure is obtained.

(Cooling process) At a high temperature such as the firing temperature, each element evenly exists in each of the crystal grains 14. Therefore, the variation of the Ba concentration and the variation of the Ca concentration are small. When the dielectric layers 11 are cooled with a large cooling speed from the phase, movement of the elements in the crystal grain 14 is suppressed. Therefore, the variation of the Ba concentration and the variation of the Ca concentration hardly occur in each of the crystal grains 14. On the other hand, when the dielectric layers 11 are cooled with a low cooling speed, the elements moves in each of the crystal grains 14. Therefore, the variation of the Ba concentration and the variation of the Ca concentration easily occur. And so, in the embodiment, the cooling condition is adjusted so that the variation of the Ba concentration and the variation of the Ca concentration occur in each of the crystal grains 14. For example, the dielectric layers 11 are cooled with a low speed from the firing temperature.

In concrete, it is preferable that it takes 15 minutes or more to cool the dielectric layers 11 from 600 degrees C. to 250 degrees C. It is more preferable that it takes 20 minutes or more to cool the dielectric layers 11 from 600 degrees C. to 250 degrees C. It is still more preferable that it takes 30 minutes or more to cool the dielectric layers 11 from 600 degrees C. to 250 degrees C. When the cooling time is large, inner crack caused by phase transformation may occur. It is preferable that the cooling time from 800 degrees C. to 250 degrees C. has an upper limit. For example, it is preferable that it takes 120 minutes or less to cool the dielectric layers 11 from 800 degrees C. to 250 degrees C. It is preferable that it takes 90 minutes or less to cool the dielectric layers 11 from 800 degrees C. to 250 degrees C. It is still more preferable that it takes 60 minutes or less to cool the dielectric layers 11 from 800 degrees C. to 250 degrees C.

(Re-oxidation process) After that, the re-oxidation process is performed in $N_2$ gas atmosphere in a temperature range of 600 degrees C. to 1000 degrees C.

(Plating process) After that, with an electrolytic plating or the like, the external electrodes 20a and 20b are coated with a metal such as Cu, Ni, and Sn.

In the manufacturing method of the multilayer ceramic capacitor of the embodiment, the cooling condition is adjusted in the cooling process after the firing process so that the variation of the Ba concentration and the variation of the Ca concentration occur in the crystal grain 14. Therefore, the Ba-rich spots PBa with respect to the standard composition of (Ba, Sr, Ca)(Zr, Ti)$O_3$ and the Ca-rich spots PCa with respect to the standard composition of (Ba, Sr, Ca)(Zr, Ti)$O_3$ are mixed together in the crystal grain 14 of the dielectric layers 11. It is therefore possible to suppress the breakdown until a higher voltage, compared to a case where Ca and Ba are evenly solid-solved in the crystal grain 14. Accordingly, the dielectric layers 11 can act as a temperature compensation member and improve the reliability of the insulation resistance. And, the cooling speed of the dielectric layer 11 is lower than that of a normal firing process. Therefore, an entire volume changing is small, and a residual stress after the firing process is small. Thus, mechanical reliability is improved.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

(Example 1) The main component of the dielectric green sheets was $(Ba_{0.17}Sr_{0.56}Ca_{0.27})(Zr_{0.95}Ti_{0.05})O_3$. The concentration of Si of the dielectric green sheets was 1 atm % when the concentration of (Zr+Ti) was 100 atm %. The concentration of Si of the dielectric sheets was 3 atm % when the concentration of (Zr+Ti) was 100 atm %. The thickness of the dielectric green sheets was 2.5 μm. A multilayer structure of the dielectric green sheets and the Ni conductive paste was fired. It took 10 to 20 minutes to cool the multilayer capacitor from 600 degrees C. to 250 degrees C. Thus, the multilayer ceramic capacitor 100 was made. The number of samples was 5. The sample numbers were 1-1 to 1-5.

(Example 2) The main component of the dielectric green sheet was $(Ba_{0.15}Sr_{0.59}Ca_{0.26})(Zr_{0.94}Ti_{0.06})$. Other conditions were the same as those of the example 1. The number of samples was 5. The sample numbers were 2-1 to 2-5.

(Analysis) Each sample was cut along a direction vertical to the internal electrode layers 12. The cross section was polished. And the composition image was observed in the cross section with a transmission type electron microscope. A transmission type electron microscope JEM2100F made by Japan Electron Optics Laboratory was used as the transmission type electron microscope. An acceleration voltage was 200 kV. An observation mode was STEM. The crystal grain 14 of which a grain diameter was 500 nm or more was observed in the dielectric layer 11. In the crystal grain 14, a pattern trace was observed. This is a part on which the variation of the Ca concentration and the variation of the Ba concentration influence.

Two of the crystal grains 14 were selected from a single dielectric layer 11 in each of the samples. 10 points of each of the two crystal grains 14 were subjected to the EDS element analysis. In the obtained image, 5 bright spots were selected, and 5 dark spots were selected. The spot size (spot diameter) was 1.0 nm.

Figure 4:
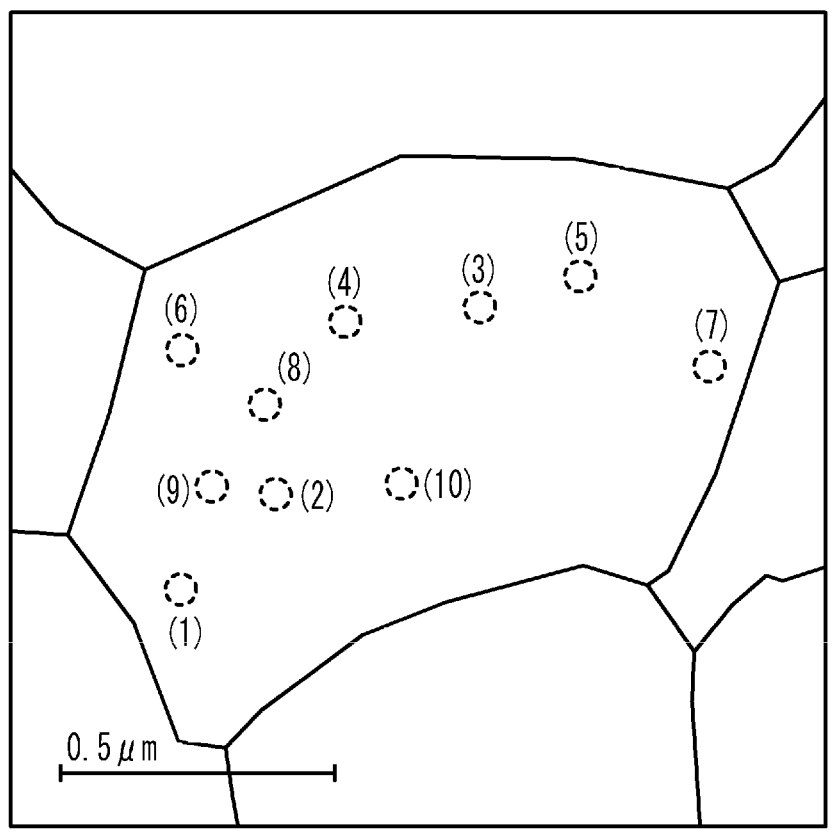
FIG. 4 illustrates selected spots in an observed crystal grain of a sample 2-3.
Figure 5:
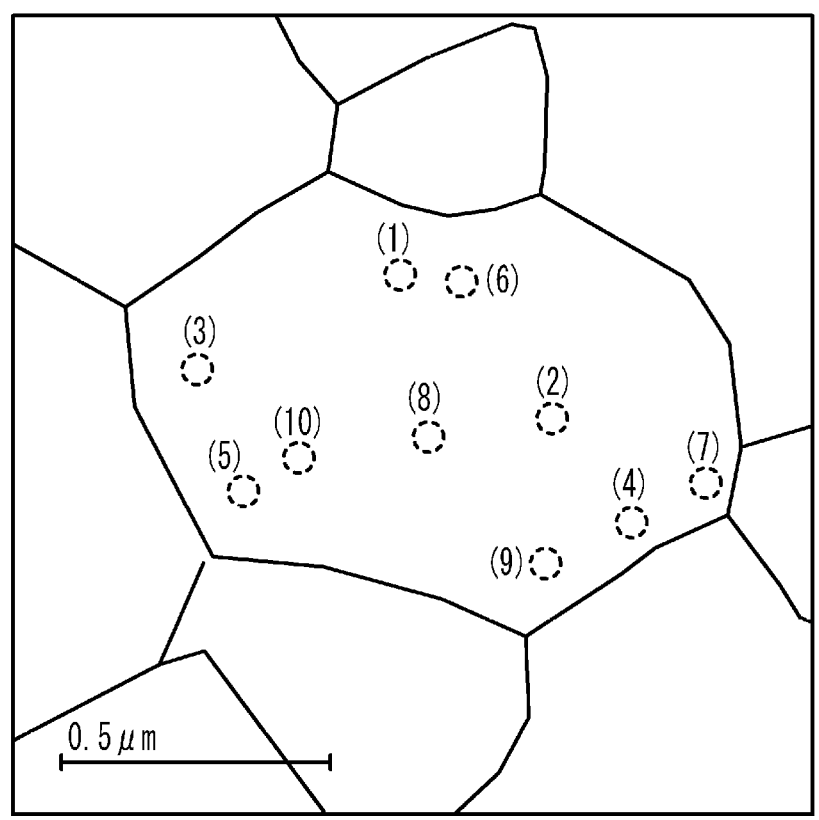
FIG. 5 illustrates selected spots in another observed crystal grain of a sample 2-3.

FIG. 4 and FIG. 5 illustrate the selected spots in the observed two crystal grains 14 of the sample 2-3. In FIG. 4 and FIG. 5, the spot 1 to the spot 5 were the bright spots. The spot 6 to the spot 10 were the dark spots. The bright spots were the Ba-rich spots. The dark spots were the Ca-rich spots.

Table 1 shows the EDS element analysis results of the spots in FIG. 4. Table 2 shows the EDS element analysis results of the spots in FIG. 5. In Table 1 and Table 2, each Ba/(Ca+Sr+Ba) of the bright spots was larger than 0.17 and 0.15 which were the standard composition ratio of Table 1 and Table 2. It was therefore confirmed that the bright spots were the Ba-rich spots. On the other hand, each Ca/(Ca+Sr+Ba) of the dark spots was larger than 0.27 and 0.26 which were the standard composition ratio of FIG. Table 1 and Table 2. It was therefore confirmed that the dark spots were the Ca-rich spots.

TABLE 1

|  | 1 | 2 | 3 BRIGHT | 4 | 5 | 6 | 7 | 8 DARK | 9 | 10 |
|---|---|---|---|---|---|---|---|---|---|---|
| O (atm %) | 60.0 | 60.1 | 60.1 | 60.2 | 60.1 | 60.1 | 60.1 | 60.3 | 60.1 | 60.2 |
| Ca (atm %) | 4.8 | 4.7 | 4.1 | 5.1 | 4.7 | 6.2 | 5.4 | 5.5 | 5.8 | 5.5 |
| Ti (atm %) | 0.9 | 1.1 | 1.2 | 1.0 | 1.2 | 1.1 | 1.3 | 1.2 | 1.1 | 1.5 |
| Sr (atm %) | 11.5 | 11.4 | 12.0 | 10.9 | 11.3 | 10.7 | 11.4 | 10.8 | 11.1 | 11.0 |
| Zr (atm %) | 19.2 | 19.1 | 18.9 | 19.3 | 19.0 | 19.1 | 19.0 | 19.3 | 19.1 | 19.0 |
| Ba (atm %) | 3.6 | 3.7 | 3.7 | 3.5 | 3.6 | 2.8 | 2.8 | 3.0 | 3.0 | 2.9 |
| Ba/(Ca + Sr + Ba) | 0.181 | 0.187 | 0.187 | 0.179 | 0.184 | 0.142 | 0.143 | 0.155 | 0.151 | 0.149 |
| Ca/(Ca + Sr + Ba) | 0.241 | 0.237 | 0.207 | 0.262 | 0.240 | 0.315 | 0.276 | 0.285 | 0.291 | 0.284 |

TABLE 2

|  | 1 | 2 | 3 BRIGHT | 4 | 5 | 6 | 7 | 8 DARK | 9 | 10 |
|---|---|---|---|---|---|---|---|---|---|---|
| O (atm %) | 60.1 | 60.1 | 60.2 | 60.3 | 60.1 | 60.3 | 60.4 | 60.2 | 60.1 | 60.2 |
| Ca (atm %) | 4.5 | 4.7 | 4.5 | 4.9 | 5.0 | 5.1 | 5.5 | 5.4 | 5.5 | 5.1 |
| Ti (atm %) | 1.1 | 1.0 | 1.1 | 1.2 | 1.2 | 1.5 | 1.4 | 1.3 | 1.1 | 1.2 |
| Sr (atm %) | 11.8 | 11.6 | 11.4 | 11.2 | 11.6 | 11.2 | 10.9 | 11.3 | 11.4 | 11.4 |
| Zr (atm %) | 19.1 | 19.2 | 19.3 | 19.3 | 18.9 | 19.2 | 19.4 | 19.2 | 19.2 | 19.3 |
| Ba (atm %) | 3.5 | 3.4 | 3.6 | 3.1 | 3.3 | 2.7 | 2.4 | 2.7 | 2.7 | 2.8 |
| Ba/(Ca + Sr + Ba) | 0.177 | 0.173 | 0.185 | 0.161 | 0.166 | 0.142 | 0.128 | 0.139 | 0.138 | 0.145 |
| Ca/(Ca + Sr + Ba) | 0.227 | 0.239 | 0.231 | 0.255 | 0.251 | 0.268 | 0.293 | 0.278 | 0.281 | 0.264 |

With respect to each sample, a standard deviation σ of (the Ca concentration)/(the Ba concentration), an average (ave) of (the Ca concentration)/(the Ba concentration) and a CV value (σ/ave) of (the Ca concentration)/(the Ba concentration) were calculated with use of the EDS element analysis result of the 20 spots. Table 3 shows the results. With respect to the sample 1-1, the standard deviation σ was 0.26, the average (ave) was 0.71, and the CV value was 0.37. With respect to the sample 1-2, the standard deviation σ was 0.22, the average (ave) was 0.73, and the CV value was 0.30. With respect to the sample 1-3, the standard deviation σ was 0.13, the average (ave) was 0.71, and the CV value was 0.19. With respect to the sample 1-4, the standard deviation σ was 0.08, the average (ave) was 0.70, and the CV value was 0.12. With respect to the sample 1-5, the standard deviation σ was 0.04, the average (ave) was 0.71, and the CV value was 0.06. With respect to the sample 2-1, the standard deviation σ was 0.72, the average (ave) was 1.76, and the CV value was 0.41. With respect to the sample 2-2, the standard deviation σ was 0.58, the average (ave) was 1.75, and the CV value was 0.33. With respect to the sample 2-3, the standard deviation σ was 0.35, the average (ave) was 1.67, and the CV value was 0.21. With respect to the sample 2-4, the standard deviation σ was 0.23, the average (ave) was 1.78, and the CV value was 0.13. With respect to the sample 2-5, the standard deviation σ was 0.12, the average (ave) was 1.74, and the CV value was 0.07.

Next, an insulation resistance was measured with respect to each sample. In concrete, the voltage-current characteristic between the external electrodes at 125 degrees C. of each sample was measured. When the electrical resistivity of a dielectric ceramics was 1 GΩm or more, the insulation condition was determined as normal. When the electrical resistivity was less than 1 GΩm, the insulation condition was determined as dielectric breakdown. When a value obtained by dividing an electric field intensity=applied voltage at which the breakdown occurred by an average layer thickness of the dielectric substance was more than 100 V/μm, the condition was determined as good "○". When the value was less than 100 V/μm, the condition was determined as bad "×". Table 3 shows the results. All sampled were determined as good "○". It is thought that this was because there are variation of the Ba concentration and variation of the Ca concentration in each crystal grain 14, and the breakdown was suppressed until a high voltage.

TABLE 3

| SAMPLE No. | σ (Ca/Ba) CONCEN- TRATION RATIO | ave (Ca/Ba) CONCEN- TRATION RATIO | CV VALUE (σ/ave) | INSULATION RESISTANCE |
|---|---|---|---|---|
| 1-1 | 0.26 | 0.71 | 0.37 | ○ |
| 1-2 | 0.22 | 0.73 | 0.30 | ○ |
| 1-3 | 0.13 | 0.71 | 0.19 | ○ |
| 1-4 | 0.08 | 0.70 | 0.12 | ○ |
| 1-5 | 0.04 | 0.71 | 0.06 | ○ |
| 2-1 | 0.72 | 1.76 | 0.41 | ○ |
| 2-2 | 0.58 | 1.75 | 0.33 | ○ |
| 2-3 | 0.35 | 1.67 | 0.21 | ○ |
| 2-4 | 0.23 | 1.78 | 0.13 | ○ |
| 2-5 | 0.12 | 1.74 | 0.07 | ○ |

Although the embodiments of the present invention have been described in detail, it is to be understood that the various change, substitutions, and alterations could be made hereto without departing from the spirit and scope of the invention. It is possible to confirm an amount of each element of the dielectric layers 11 by performing ICP analysis or La-ICP-MS (Laser Ablation Inductively Coupled Plasma Mass Spectrometry). And it has been confirmed that the amount of each element of a product measured by the analysis coincide with an amount of each element added as a raw material.

What is claimed is:

1. A ceramic electronic device comprising:
    a multilayer structure in which each of dielectric layers and each of internal electrode layers are alternately stacked,
    wherein a main component of the dielectric layers is (Ba, Sr, Ca)(Zr, Ti)O3,
    wherein a Ba concentration and a Ca concentration have variation in at least one of crystal grains in the dielectric layers,
    wherein a CV value of (the Ca concentration)/(the Ba concentration) of 20 points of one or more crystal grains is 0.06 or more in a cross section of the dielectric layers.

2. The ceramic electronic device as claimed in claim 1, wherein the 20 points include 10 points of one of crystal grains of the dielectric layers and 10 points of another crystal grain of the dielectric layers.

3. The ceramic electronic device as claimed in claim 1, wherein when a standard composition of (Ba, Sr, Ca)(Zr, Ti)O3 of the dielectric layers is expressed as $(Ba_xSr_yCa_z)(Zr_sTi_t)O_3$, relations of $0<x<0.4$, $0<y<0.7$, $0<z<0.8$, $x+y+z=1$, $0.9<s<1$, and $0<t<0.1$ are satisfied.

4. The ceramic electronic device as claimed in claim 1, wherein an average diameter of crystal grains of the dielectric layers is 0.1 μm or more and 1.0 μm or less.

5. The ceramic electronic device as claimed in claim 1, wherein the dielectric layers have a thickness of 1 μm or more and 10 μm or less.

6. A manufacturing method of a ceramic electronic device comprising:
    forming a multilayer structure in which each of dielectric green sheets and each of metal conductive paste layers are alternately stacked, the dielectric green sheets including powder of (Ba, Sr, Ca)(Zr, Ti)O3,
    forming dielectric layers from the dielectric green sheets by firing the multilayer structure; and
    cooling the multilayer structure after the firing,
    wherein a cooling condition of the cooling is adjusted in the cooling so that a Ba concentration and a Ca concentration have variation in at least one of crystal grains in the dielectric layers and a CV value of (the Ca concentration)/(the Ba concentration) of 20 points of one or more crystal grains is 0.06 or more in a cross section of the dielectric layers.

7. The method as claimed in claim 6, wherein it takes 15 minutes or more in the cooling from 800 degrees C. to 250 degrees C.

8. The ceramic electronic device as claimed in claim 1, wherein a thickness of the each of internal electrode layers is 1 μm or less.

9. The ceramic electronic device as claimed in claim 1, wherein a thickness of the each of internal electrode layers is 0.5 μm or less.

10. The ceramic electronic device as claimed in claim 1, wherein the CV value is 0.12 or more.

11. The ceramic electronic device as claimed in claim 1, wherein the CV value is 0.19 or more.

12. A ceramic electronic device comprising:
    a multilayer structure in which each of dielectric layers and each of internal electrode layers are alternately stacked,
    wherein a main component of the dielectric layers is (Ba, Sr, Ca)(Zr, Ti)O3,
    wherein a Ba concentration and a Ca concentration have variation in at least one of crystal grains in the dielectric layers,
        wherein when a standard composition of (Ba, Sr, Ca)(Zr, Ti)O3 of the dielectric layers is expressed as $(Ba_xSr_yCa_z)(Zr_sTi_t)O_3$, relations of $0<x<0.4$, $0<y<0.7$, $0<z<0.8$, $x+y+z=1$, $0.9<s<1$, and $0<t<0.1$ are satisfied.

* * * * *